(12) United States Patent
Lawall et al.

(10) Patent No.: US 8,052,112 B2
(45) Date of Patent: Nov. 8, 2011

(54) FORE-AFT POSITION ADJUSTER UTILIZING ACTIVE MATERIAL ACTUATION

(75) Inventors: Jennifer P. Lawall, Waterford, MI (US); Diane K. McQueen, Leonard, MI (US); Nancy L. Johnson, Northville, MI (US); Paul W. Alexander, Ypsilanti, MI (US); Alan L. Browne, Grosse Pointe, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 109 days.

(21) Appl. No.: 12/403,397

(22) Filed: Mar. 13, 2009

(65) Prior Publication Data
US 2009/0230275 A1 Sep. 17, 2009

Related U.S. Application Data

(60) Provisional application No. 61/036,439, filed on Mar. 13, 2008.

(51) Int. Cl.
*F16M 13/00* (2006.01)
(52) U.S. Cl. .... 248/429; 248/550; 297/312; 297/344.11
(58) Field of Classification Search .................. 248/424, 248/429, 430, 550; 297/344.11, 311, 312
See application file for complete search history.

(56) References Cited

U.S. PATENT DOCUMENTS

| | | | | |
|---|---|---|---|---|
| 6,772,985 B2* | 8/2004 | Lee | .............................. | 248/424 |
| 6,854,782 B2* | 2/2005 | Reichert et al. | ............ | 296/65.13 |
| 6,874,746 B2 | 4/2005 | Ganot | | |
| 6,892,995 B2* | 5/2005 | Tame et al. | .................... | 248/429 |
| 6,935,692 B2* | 8/2005 | Nishide et al. | ........... | 297/344.11 |
| 6,986,493 B2* | 1/2006 | Yokota | ............................ | 248/429 |
| 7,147,261 B2 | 12/2006 | Ventura et al. | | |
| 7,293,836 B2* | 11/2007 | Browne et al. | ........... | 297/344.11 |
| 7,581,706 B2* | 9/2009 | Kennedy et al. | .............. | 248/424 |
| 7,669,825 B2* | 3/2010 | Sung | ............................. | 248/429 |
| 7,722,006 B2* | 5/2010 | Beneker et al. | ............... | 248/424 |
| 7,775,596 B2* | 8/2010 | Kennedy et al. | ......... | 297/362.11 |
| 2002/0060281 A1* | 5/2002 | Okazaki et al. | ................ | 248/424 |
| 2004/0182983 A1* | 9/2004 | Goodbred et al. | ............ | 248/424 |
| 2004/0217251 A1* | 11/2004 | Leguede et al. | ............... | 248/424 |
| 2005/0093328 A1 | 5/2005 | Moriyama | | |
| 2006/0036045 A1* | 2/2006 | Wilson et al. | ................. | 525/452 |
| 2007/0069100 A1* | 3/2007 | Schuler et al. | ................ | 248/430 |
| 2009/0322136 A1* | 12/2009 | Kazyak et al. | ............. | 297/344.1 |
| 2010/0102192 A1* | 4/2010 | Tarusawa et al. | .............. | 248/429 |

FOREIGN PATENT DOCUMENTS

KR 10-2007-0068861 A 7/2007

* cited by examiner

*Primary Examiner* — Terrell McKinnon
*Assistant Examiner* — Bradley Duckworth

(57) ABSTRACT

A fore-aft positioning adjuster adapted for use with an object, such as a seat, includes a locking mechanism, and an actuator employing an active material element operable to undergo a reversible change when exposed to or occluded from an activation signal, and configured to selectively cause the mechanism to release, so that the object can be repositioned, as a result of the change.

13 Claims, 6 Drawing Sheets

US 8,052,112 B2

FORE-AFT POSITION ADJUSTER UTILIZING ACTIVE MATERIAL ACTUATION

RELATED APPLICATIONS

This patent application claims priority to, and benefit from U.S. Provisional Patent Application Ser. No. 61/036,439, entitled "SEAT ADJUSTER ACTUATION RELEASE THROUGH ACTIVE MATERIALS," filed on Mar. 13, 2008, and incorporated by reference herein.

BACKGROUND OF THE INVENTION

1. Field of the Invention

The present disclosure generally relates to a locking mechanism for retaining an object, such as a seat, in a fore-aft position; and more particularly, to a locking mechanism that utilizes active material actuation to release and/or relock the object in a fore-aft position.

2. Discussion of Prior Art

Conventional locking mechanisms used in securing an object in a fore-aft position feature manual or electro-mechanical releases that present various concerns in the art. For example, in an automotive setting, fore-aft seat positioning typically involves complex releasing mechanisms that require the occupant to reach and exert sufficient force upon an often large handle. In response, powered actuators have been developed to release and/or reposition the seat; however, these mechanisms typically feature complex electro-mechanical configurations, including motors, solenoids, cylinders, valves, etc., that add to the weight, complexity, reduction in packaging space, and costs of the vehicle.

BRIEF SUMMARY OF THE INVENTION

The present invention addresses these concerns, and recites a fore-aft positioning adjustment system that utilizes active material actuation to more efficiently release the associated object for manipulation. The inventive adjuster provides an automatic method for releasing an object, so as to be repositioned in the fore-aft direction, and re-locking the object in the new position, which does not require occupant effort, or an electro-mechanical, electromagnetic, or electro-hydraulic motor. In an automotive setting, the additional packaging space provided by the invention allows for more accessible placement of seat position controls.

The invention utilizes the change experienced by active (or "smart") materials, when exposed to an activation signal, to effect release. As such, in comparison to traditional actuators, the invention reduces equivalent component size, weight, and noise (both acoustically and with respect to electromagnetic field radiation); as well as improves robustness, and design capabilities.

In general, the present invention concerns a fore-aft position adjuster adapted for use with a seat. The adjuster includes a locking member securely connected to the seat, so as to be translatable therewith, and a fixed structure connected to a base. The member and structure are cooperatively configured so as to be caused to achieve one of disengaged and engaged conditions. The member and seat are free to translate in the disengaged condition, and fixed in the engaged condition, relative to the base. An actuator drivenly coupled to the structure or member includes an active material element operable to undergo a reversible change when exposed to or occluded from an activation signal, and selectively cause the member and structure to disengage, as a result of the change.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION OF THE INVENTION

Figure 1:
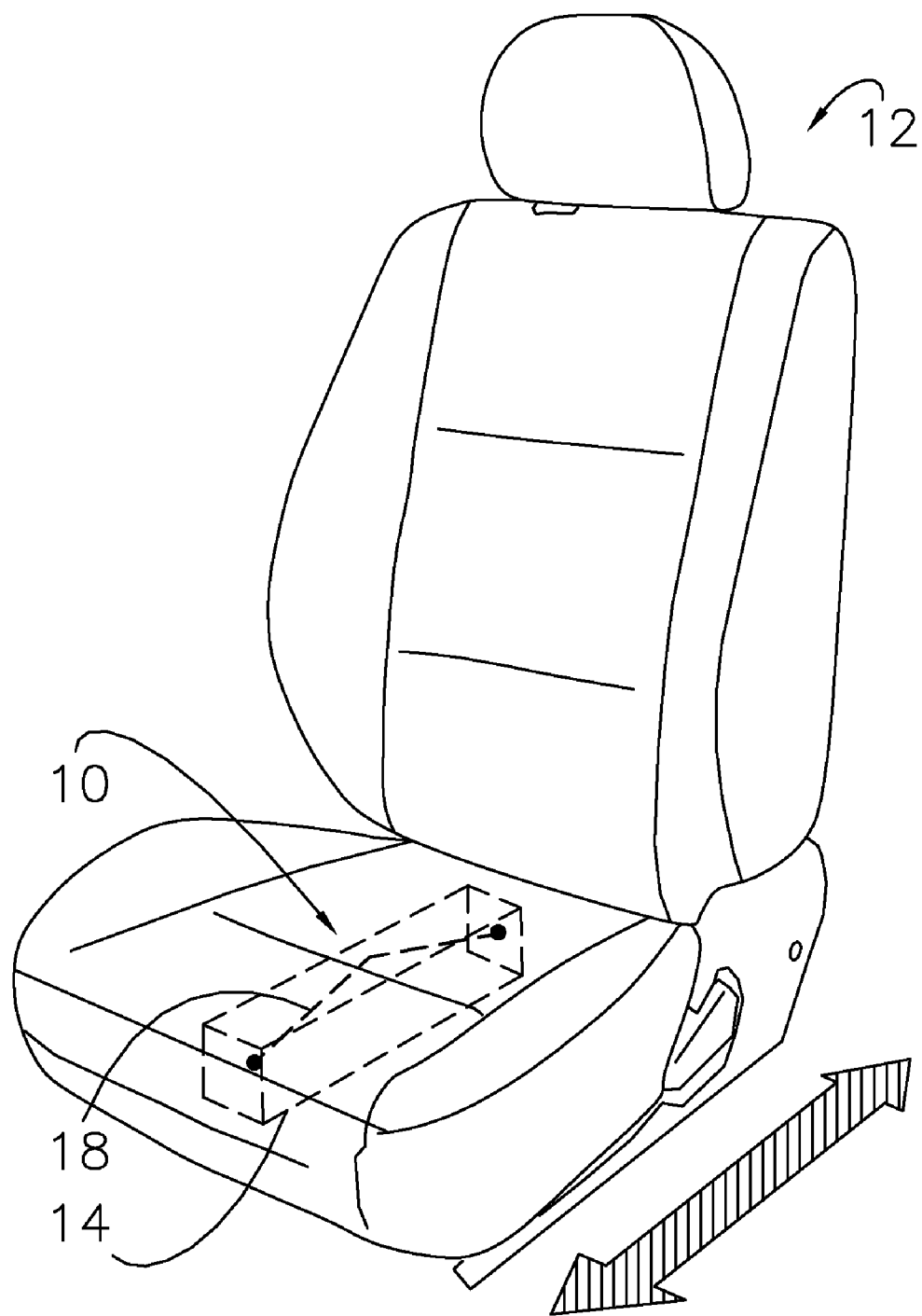
FIG. 1 is a perspective view of an automotive seat and a fore-aft positioning adjuster (in hidden-line type) disposed beneath the seat, in accordance with a preferred embodiment of the invention.

The following description of the preferred embodiments is merely exemplary in nature and is in no way intended to limit the invention, its application, or uses. The invention is described and illustrated with respect to a fore-aft positioning adjuster 10 (FIGS. 1-9b) adapted for use with an automotive seat 12 (FIGS. 1 and 2); however, it is well appreciated that the benefits of the invention may be utilized variously with other selectively repositioned objects, including conveyor pallets and the like. The invention general recites a powered adjuster 10 consisting of a locking mechanism 14 configured to fix the seat (or object) 12 relative to a base 16 when in an engaged condition, and an actuator 18 comprising an active material element 20 configured to cause the mechanism 14 to disengage so as to enable the seat 12 to translate relative to the base 16.

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Suitable active materials for use with the present invention include but are not limited to shape memory alloys, ferromagnetic shape memory alloys, shape memory polymers, electroactive polymers (EAP), and piezo-electric ceramics. As it is appreciated that these types of active materials have the ability to rapidly displace, or remember their original shape and/or elastic modulus, which can subsequently be recalled by applying an external stimulus. As such, deformation from the original shape is a temporary condition. In this manner, an element composed of these materials can change to the trained shape in response to either the application or removal (depending on the material and the form in which it is used) of an activation signal.

For example, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be pseudo-plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the marten site to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force if it is judged that there is a need to reset the device.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudoplastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

Stress induced phase changes in SMA, caused by loading and unloading of SMA (when at temperatures above $A_f$), are, however, two way by nature. That is to say, application of sufficient stress when an SMA is in its austenitic phase will cause it to change to its lower modulus martensitic phase in which it can exhibit up to 8% of "superelastic" deformation. Removal of the applied stress will cause the SMA to switch back to its austenitic phase in so doing recovering its starting shape and higher modulus.

Ferromagnetic SMA's (FSMA's) are a sub-class of SMAs. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a prestrained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. With respect to the present invention, it is appreciated that electroactive polymers may be fabricated and implemented as a thin film defining a preferred thickness below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Finally, it is appreciated that piezoelectric ceramics can also be employed to produce force or deformation when an electrical charge is applied. PZT ceramics consist of ferroelectric and quartz material that are cut, ground, polished, and otherwise shaped to the desired configuration and tolerance. Ferroelectric materials include barium titanate, bismuth titanate, lead magnesium niobate, lead metaniobate, lead nickel niobate, lead zinc titanates (PZT), lead-lanthanum zirconate titanate (PLZT) and niobium-lead zirconate titanate (PNZT). Electrodes are applied by sputtering or screen printing processes, and then the block is put through a poling process where it takes on macroscopic piezoelectric properties. Multi-layer piezo-actuators typically require a foil casting process that allows layer thickness down to 20 µm. Here, the electrodes are screen printed, the sheets laminated, and a compacting process increases the density of the green ceramics and removes air trapped between the layers. Final steps include a binder burnout, sintering (co-firing) at temperatures below 1100° C., wire lead termination, and poling.

Returning to FIGS. 1-9b, the active fore-aft positioning adjuster 10 is shown being employed by an automotive seat 12. As shown in FIGS. 2 and 3, for example, the locking mechanism 14 may generally consists of a locking member 22 securely connected to the seat 12, so as to be translatable therewith, and a fixed structure 24 connected to the base 16. Though depicted and suggested by nomenclature, it is appreciated that the term "base" is not limited to a load bearing body or supportive/underneath configurations, and encompasses any body or surface presenting a fixed reference throughout an adjustment event. For example, the base 16 may be presented by a wall or ceiling upon which the structure 24 is fixed.

The member 22 and structure 24 are cooperatively configured so as to be caused to achieve one of disengaged and engaged conditions. The member 22 and seat 12 are free to translate in the disengaged condition, and relatively fixed in the engaged condition. The actuator 18 is drivenly coupled to the structure 24 and/or member 22, so as to selectively cause them to disengage upon demand or controlled actuation.

As previously mentioned, the actuator 18 includes an active material element 20 operable to undergo a reversible change in fundamental property when exposed to or occluded from an activation signal. The element 20 presents sufficient actuation force to cause the adjuster 10 to move to one of the conditions when activated, and may be configured to directly or indirectly drive manipulation. It is appreciated that the gauge, cross-sectional area, length, and/or otherwise configuration of the element 20 necessary to effect the actuation force, based on the active material employed, is readily determinable by those of ordinary skill in the art, and as such, the selection criteria will not be described in detail herein. In the illustrated embodiments, the actuator 18 is generally shown consisting of a linearly acting SMA wire 20, wherein the term "wire" is used in a non-limiting sense, and encompasses other equivalent geometric configurations such as bundles, braids, cables, ropes, chains, strips, etc.

As shown in FIGS. 6-9b, for example, the wire 20 may be fixedly connected to a translatable portion of the locking mechanism 14, and oppositely to a fixed anchor (e.g., seat frame, etc.) 26. More preferably, the wire 20 is connected to anchors 26 at both ends, and medially tensioned by the mechanism, so as to form a vertex therewith, and a bow-string configuration (FIG. 3). In this configuration, it is appreciated that wire activation results in amplified displacement at the vertex due to the trigonometric relationship presented. The wire 20 is preferably connected to the locking mechanism 14, and anchors 26 through reinforcing structural fasteners (e.g., crimps, etc.), which facilitate and isolate mechanical and electrical connection.

It is appreciated that return of the mechanism 14 to the original condition may be passively affected by the weight of the translated portion of the mechanism 14 (where the actuator 18 acts to lift); or, actively effected by a two-way shape memory element 20. Where the element 20 presents one-way actuation, however, a separate return mechanism (i.e., "return") 28 is preferably provided to generate a biasing force towards return. In this configuration, the return mechanism 28 acts antagonistically to the actuator 18, and as shown in the illustrated embodiment, may be embodied by a compression, extension, leaf, or torsion spring, elastomer, pneumatic/hydraulic springs, elastomeric components (e.g., snubbers), counterweights, additional active material elements, or the like.

Figure 6:
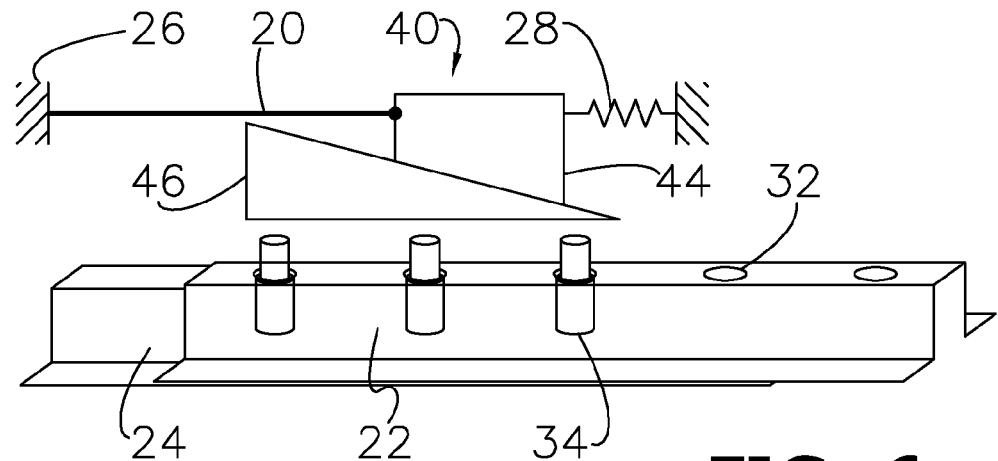
FIG. 6 is a side elevation of the adjuster shown in FIG. 3, including an actuator including a shape memory wire drivenly coupled to a block and wedge configured to amplify force, and engage the pins when caused to relatively translate, in accordance with a preferred embodiment of the invention.
Figure 7:
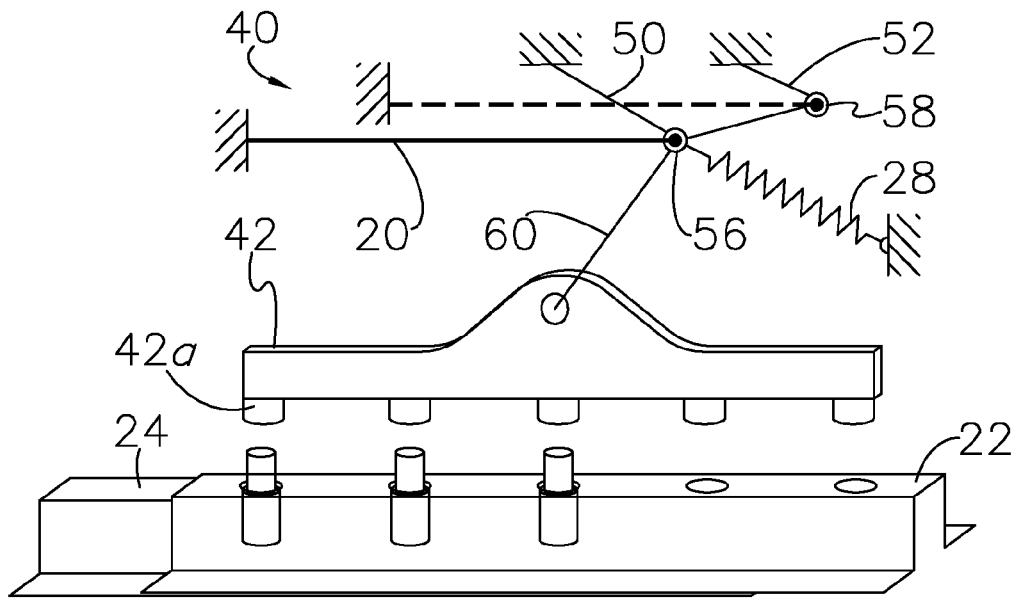
FIG. 7 is a side elevation of the adjuster shown in FIG. 3, wherein the actuator includes a shape memory wire drivenly coupled to a linkage configured to amplify force and engage the pins when caused to swing, in accordance with a preferred embodiment of the invention.

For example, in FIGS. 6 and 7, the return mechanism 28 is an extension spring drivenly coupled to the locking mechanism 14 opposite the actuator 18. When the actuator 18 causes the locking member to swing clockwise, the spring 28 is caused to store energy by stretching. As such, it is appreciated that the actuation force generated by the element 20 is greater than the spring force of the spring 28. Upon deactivation, the spring 28 stretches the deactivated wire 20, such that it causes the mechanism 14 to revert to the original condition. It is appreciated that the stress experienced by the wire 20 accelerates transformation back to the Martensitic phase.

Figure 2:
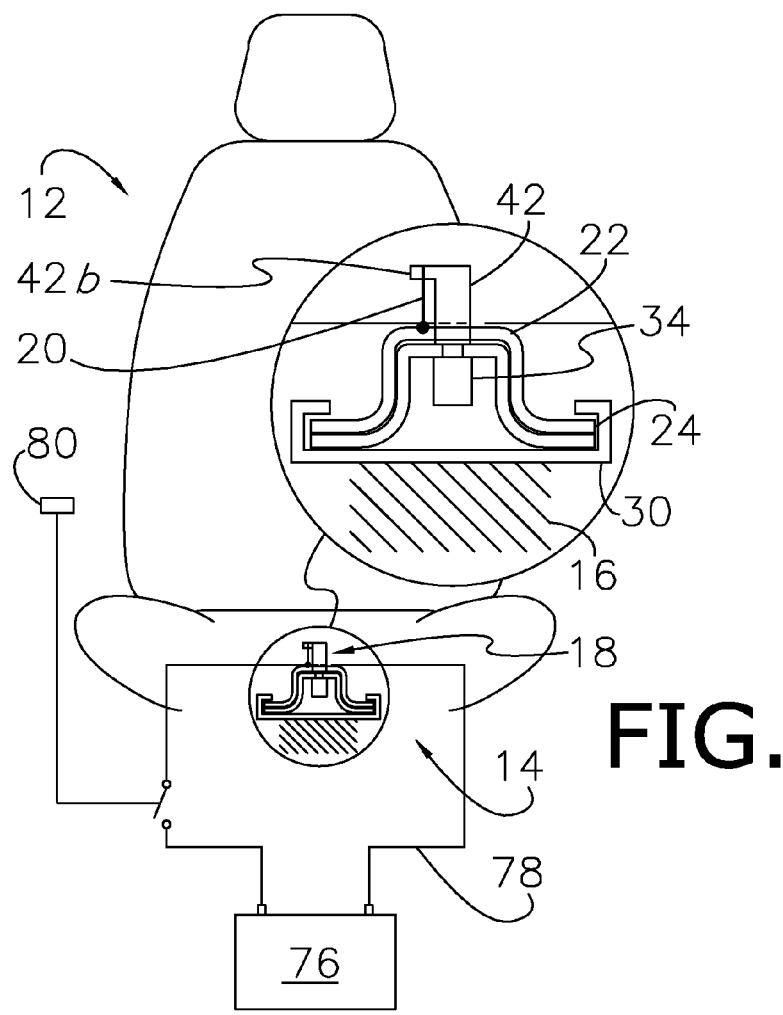
FIG. 2 is a front elevation of the seat shown in FIG. 1, particularly illustrating the adjuster including a signal source and input device.
Figure 3:
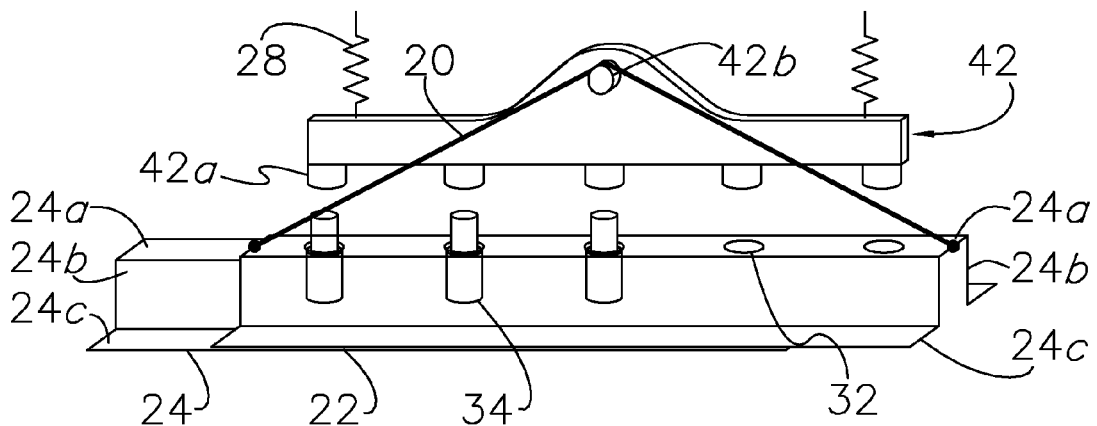
FIG. 3 is a side perspective view of a fore-aft positioning adjuster including a multi-channel locking mechanism having plural translatable pins, and a shape memory wire actuator drivenly coupled to a translatable bar, in accordance with a preferred embodiment of the invention.
Figures 8, 8A:
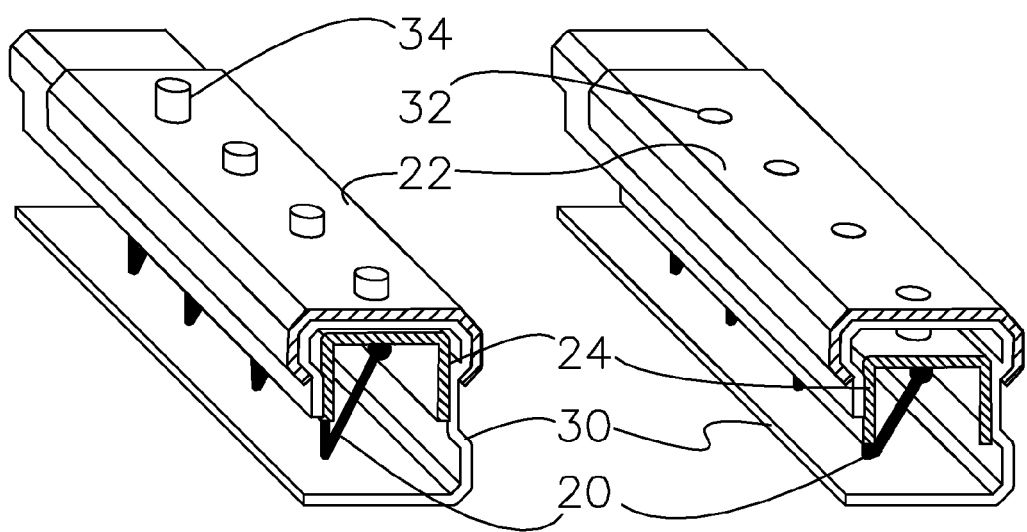
FIG. 8 is a perspective view of a fore-aft positioning adjuster including a translatable channel having a plurality of fixed pins aligned with a plurality of holes defined by an outer channel, wherein the pins are in a raised condition, and an internally disposed shape memory wire actuator drivenly coupled to the translatable channel, in accordance with a preferred embodiment of the invention.
FIG. 8a is a perspective view of the adjuster shown in FIG. 8 wherein the wire has been activated and the pins lowered resultantly.

In the illustrated embodiments, the structure 24 and member 22 present first and second longitudinally channels that cooperatively form a linear track in the fore-aft direction (FIGS. 1, 2 and 8). The channels 22,24 are telescopingly engaged, and present congruent cross-sections so as to define generally superjacent layers. More particularly, the channels 22,24 present top-hat cross-sections, including uppermost intermediate panels 22a, 24a, first and second lateral walls 22b, 24b distending from the panels 22a, 24a, and flared wing sections 22c, 24c outwardly projecting from the bottom of the walls 22b, 24b. The channels 22,24 are cooperatively configured so that the outer wall surface of the inner channel 24 is generally adjacent the inner wall surfaces of the outer channel 22. More preferably, at least a third guide channel 30 may be provided to laterally support the first and second channels 22,24 (FIG. 3).

In a first embodiment, a plurality of longitudinally spaced holes (or "openings") 32 are defined along the centerline of the outer channel panel 22a, and at least one, and more preferably a lesser plurality of pins 34 emanate from the inner channel panel 24a. In FIGS. 3-7, the pins 34 are vertically translatable between a raised and lowered condition. Each pin 34 is concentrically alignable with a selected one of the holes 32, and the pins 34 and holes 32 present congruent cross-sections, such that the pins 34 are able to be caused to protrude through the holes 32 only when in the raised condition.

Figure 4:
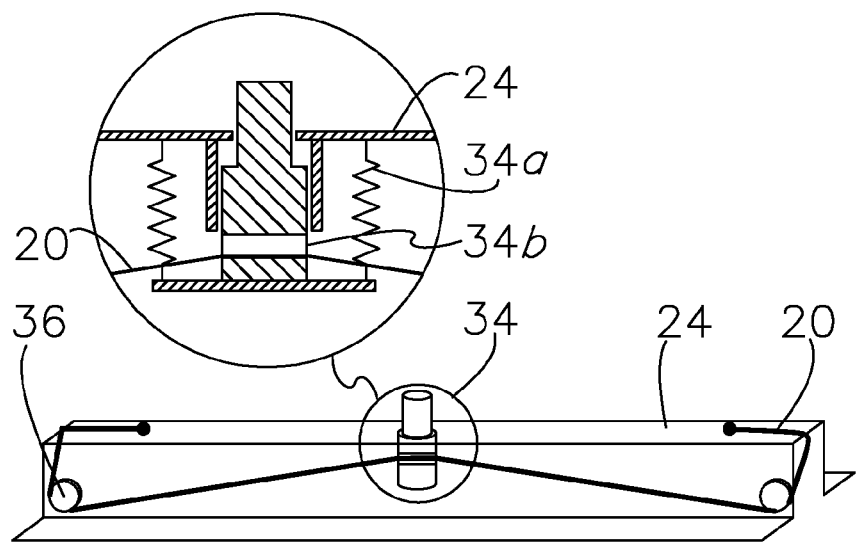
FIG. 4 is a side elevation of the adjuster shown in FIG. 3, wherein the shape memory wire is entrained by pins and distal pulleys, and doubled-over so as to be attached to the upper channel and present a self-contained system, in accordance with a preferred embodiment of the invention.

The pins 34 are preferably biased towards the raised condition. To that end, the pin 34 may be concentrically aligned and engaged by a compression spring 34a configured to generate a biasing force upon the pin 34 (FIG. 4). As the pin 34 is caused to lower by the actuator 18, the spring 34a is caused to store energy by compressing. Once, the actuator 18 disengages the pins 34, the spring 34a releases its energy, so as to cause the pins 34 to again rise and protrude through the openings 32.

Figure 5:
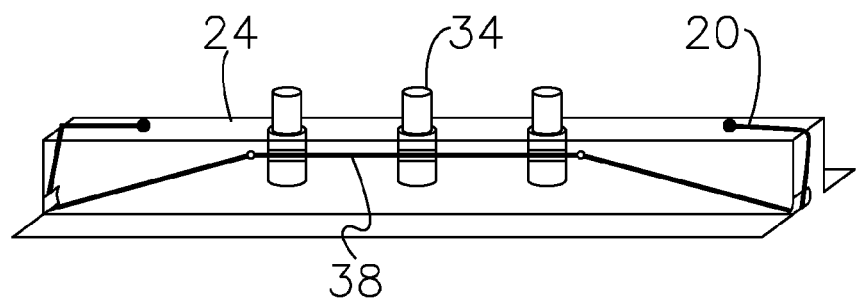
FIG. 5 is a side elevation of the adjuster shown in FIG. 4, wherein a passive, high-strength section of the wire engages the pins, in accordance with a preferred embodiment of the invention.

As shown in FIGS. 4 and 5, the actuator 18 may consist of at least one SMA wire 20 inter-laced through an opening 34b defined by each of the pins 34. A singular wire 20 may be used to drive all of the pins 34; or more preferably, so as to receive equal force, each pin 34 may be driven by a separate and individually actuated wire 20. The wire(s) 20 presents sufficient length and recoverable strain to allow the pins 34 to achieve the raised condition when deactivated. When activated the wire 20 contracts, thereby causing the pins 34 to achieve the lowered condition. The wire 20 may be externally anchored, or may be connected to the top surface of the stationary channel 24, so as to be self-contained. With respect to the latter, the distal edges of the channel 24 may be rounded, or more preferably, a pulley 36 may be provided to facilitate doubling-over the wire 20. As shown in FIG. 5, the preferred wire 20 in this configuration includes a passive, high strength section 38, made of durable material that interengages the pins 34. The section 38 may be a steel cable or rod.

In addition to the active material element 20, the actuator 18 may further include a transmission 40 preferably configured to provide mechanical advantage as to force or displacement. In FIG. 3, the transmission 40 includes a translatable bar 42 positioned and configured to selectively and concurrently engage the pins 34. More particularly, the bar 42 presents a plurality of pin engaging stems 42a and is positioned above the pins 34. As previously mentioned, a shape memory wire 20, preferably formed of SMA material in the Martensitic phase entrains a medial bar prong 42b, so as to form a bow string configuration as shown. When the wire 20 is activated, the bar 42 is caused to lower and concurrently engage the pins 34, driving them below the holes 32. This frees the member 22 to translate along the track.

The pins 34 may further include a detent or locking mechanism (not shown) that function to retain the pins 34 in the lowered condition until adjustment is complete. It is appreciated that the bar 42 is preferably biased towards the upper (disengaged) position, so as to be caused to raise when the wire is deactivated. For example the bar 42 may be further coupled to at least one extension spring 28 as shown in FIG. 3. It is appreciated that the biasing force acting upon the activated wire induces a stress in the wire, which accelerates transformation back to the Martensite phase. To facilitate the translation of the member 22 when the wire 20 is in the austenitic phase, the stems 42a are brought to a flush position with the lower surface of the member 22. The stems 42a present a foot-print area equal to that of the holes 32, so that the member 22 completely overlays, so as to prevent the pins 34 from raising and blocking adjustment. Once the seat 12 has been positioned, the stems 42a can be raised so that each pin 34 is able to enter the next encountered hole 32.

Alternatively, the bar 42 can be replaced by a block 44 and wedge 46 that define a sloped interface (FIG. 6). Here, the element 20 is configured to cause the block 44 or wedge 46 to longitudinally translate relative to the other, when activated. The relative translation causes the block 44 (or wedge 46) to drive the pins 34 towards the lowered condition, so that the member 22 and structure 24 are disengaged. It is appreciated that the advantage in horizontal displacement versus vertical translation depends upon the angle of the sloped interface. Finally, and as also shown in FIG. 6, a return spring 28 may be engaged to the driven one of the block 44 and wedge 46 opposite the actuator 18, so as to reverse the horizontal displacement when the wire 20 is deactivated.

In another transmission alternative, the actuator 18 may be drivenly coupled to a linkage 48 (FIG. 7) comprising first and second links 50,52 pivotally distending from an anchor 26 (e.g., the seat frame, etc.) at separate locations, a cross-link 54 pivotally interconnecting the distal ends of the first and second links 50,52, so as to define fore and aft joints 56,58 relative to the actuator 18, and a lowermost link 60 pivotally interconnecting the fore joint 56 and bar 42. The actuator 18 may include a shape memory wire 20 drivenly coupled to the fore joint 56, as shown. The wire 20 is configured to cause the linkage 48 to swing as a result of the change, and swinging the linkage 48 causes the bar 42 to be driven downward and the pins 34 to achieve the lowered condition. Alternatively, it is appreciated that the wire 20 may be drivenly coupled to the aft joint 58 instead, as shown in hidden line type in FIG. 7. By varying the lengths of the links, the force or displacement offered by the linkage 48 can be amplified.

In another embodiment shown in FIGS. 8 and 8a, the pins 34 are fixedly attached to the inner channel 24, which is vertically translatable, but longitudinally fixed with respect to the base 16. The inner channel 24 is preferably biased towards the raised condition. The actuator 18 includes a shape memory wire 20 interconnected between the inner channel 24 and base 16, and configured to selectively cause the channel 24 and pins 34 to be lowered, such that the member 22 is disengaged. To increase the overall length, the wire 20 may present a shoe-lace pattern of alternating connections with the base 16 and channel 24 (FIG. 8). Finally, a plurality of compression springs 28 are preferably disposed intermediate the channel 24 and base 16, so as to bias the inner channel 24 and pins 34 towards the raised condition, as previously mentioned.

Figure 8B:
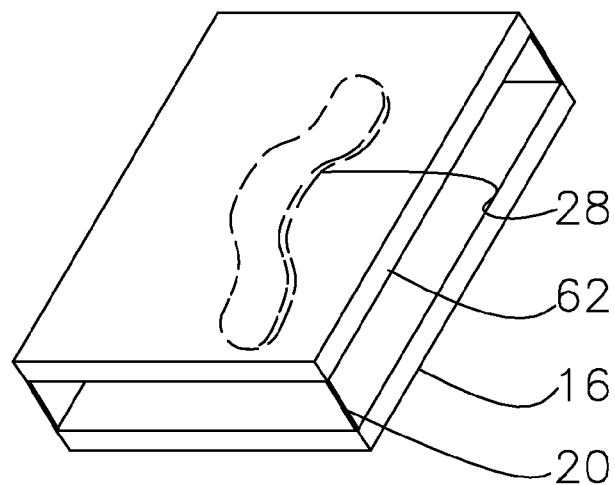
FIG. 8b is a perspective view of an internal plate having a plurality of fixed pins, wherein the plate and a base are interconnected by and drivenly coupled to a plurality of shape memory wire actuators and an intermediate leaf spring, in accordance with a preferred embodiment of the invention.

Alternatively, a plurality of wires 20 may vertically interconnect the channel 24 and base 16. In FIG. 8b, for example, the channel is replaced by a plate 62, and four vertically oriented wires 20 are drivenly coupled to the plate 62 and base 16 at the corners of the plate 62. The return mechanism 28 in this configuration may be a singular leaf spring sandwiched between the plate 62 and base 16, so as to exert a constant upward biasing force upon the plate. Here, the plate 62 defines the insertion pins 34 and the mechanism 14 functions as previously described.

Figure 9:
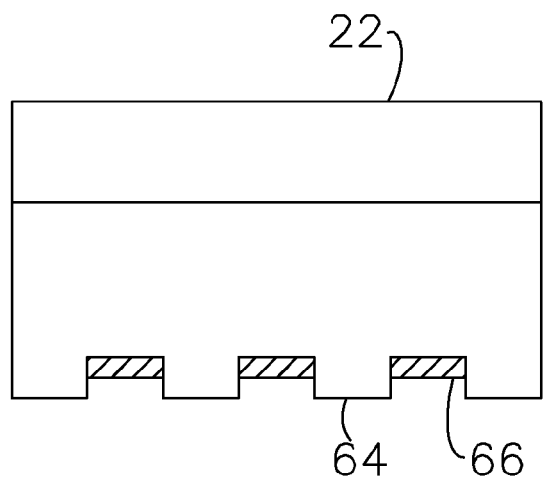
FIG. 9 is a perspective view of a fore-aft positioning adjuster including a toothed structure and pivotal locking member drivenly coupled to a shape memory wire actuator and a return mechanism, in accordance with a preferred embodiment of the invention.
Figure 9A:
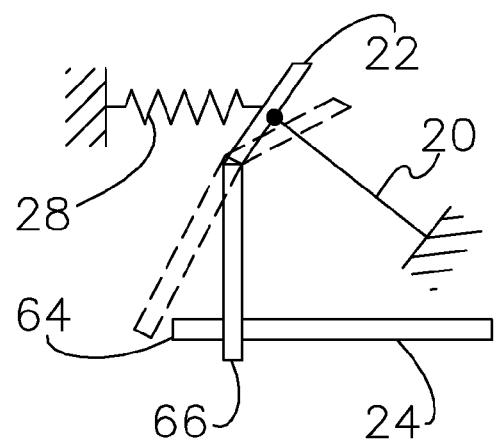
FIG. 9a is a front elevation of the adjuster shown in FIG. 9, wherein the wire has been activated and the member pivoted as a result thereof.

In another embodiment, the member 22 defines at least one, and more preferably a plurality of teeth (or notches) 64, and the structure 24 defines a second plurality of teeth 66 configured to selectively inter-mesh the member teeth, so as to present the engaged condition. To cause inter-meshing, the member 22 and structure 24 are relatively translatable. For example, as shown in FIGS. 9 and 9a, the member 22 may be pivotally coupled to the seat 12, and able to swing between a raised condition wherein the member teeth 64 clear the structure teeth 66, and a lowered condition wherein the teeth 64,66 inter-mesh. The element 20 is drivenly coupled to the member 22, and operable to cause it to swing between the conditions. More preferably, a return mechanism 28, such as the extension spring shown, or alternatively a torsion spring, may be also drivenly coupled to the member 22, so as to act antagonistically to the actuator 18. Here, it is appreciated that the actuator 18 may spool the SMA wire 20 about the pivot axis, or employ an SMA based torque tube (or EAP roll actuator) operable to selectively cause the structure 20 to rotate by generating a moment about the pivot axis.

Figure 10:
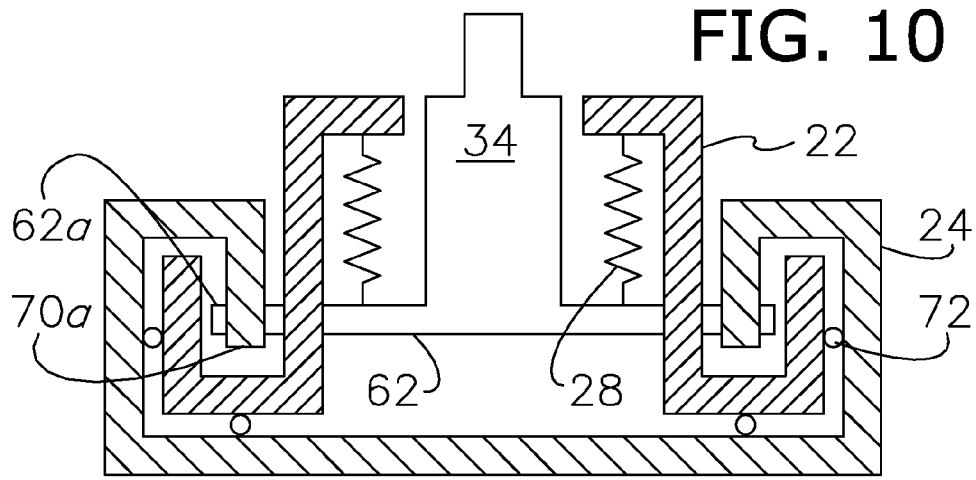
FIG. 10 is a cross-section of a fore-aft positioning adjuster including a toothed structure and translatable locking member fixedly coupled to a pin, roller balls inter-engaging the structure and member, and a return mechanism comprising first and second extension springs, in accordance with a preferred embodiment of the invention.
Figure 10A:
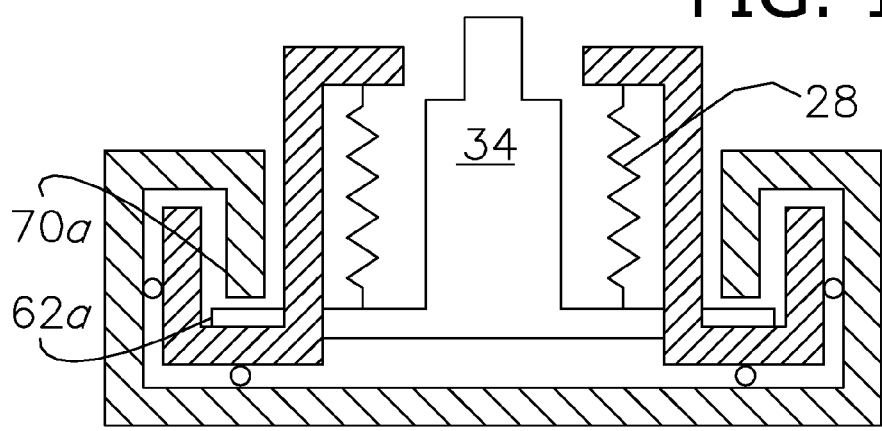
FIG. 10a is a cross-section of the adjuster shown in FIG. 10, wherein the actuator 18 has caused the pin and locking member to translate and the springs to stretch.
Figure 10B:
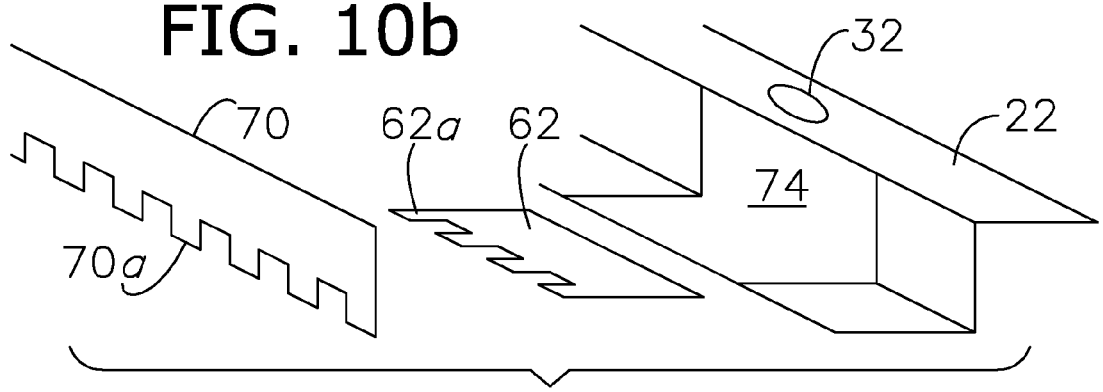
FIG. 10b is an exploded view of the adjuster shown in FIG. 10.

Finally, in yet another embodiment, the functional aspects (e.g., pins and teeth) of the prior two locking mechanisms 14 are combined. In FIGS. 10-10b, a flat structural channel 24 is fixed to the base 16, and the member channel 22 is again fixed to the seat 12. In this configuration, the member 22 and structure 24 further define a tongue 68 and groove 70 emanating from their wings 22c, 24c, respectively. The tongue 68 of the translatable when free member 22 is slidably received within the groove defined by the structure 24. More preferably a plurality of rollers 72 are provided to reduce friction between the two. The innermost wall of the groove 70 defines a plurality of notches (or teeth) 70a adjacent its lower edge.

The inner channel 22 defines a plurality of openings 32 through which a plurality of retractable pins 34 pass. Here, however, the pins 34 are not longitudinally engaged, but instead present a push button for selectively lowering a locking plate 62 fixedly attached to their lower ends. In this configuration the plate 62 presents a plurality of outer teeth 62a that are receivable by the notches 70a. The plate 62 and pins 34 are retractable between raised and lowered conditions, wherein the raised condition the teeth 62a, 70a inter-mesh, and in the lowered condition, clear each other. The plate 62 and pins 34 are preferably biased by, for example, the extension spring shown in FIG. 10, or the leaf spring shown in FIG. 8b, towards the raised condition. So as to enable inter-meshing, it is appreciated that the side wall 22b of the inner channel 22 defines cutouts 74 at every pin 34 (FIG. 10b), so as to enable the plate 62 and outer teeth 62a to engage the groove 70. Finally, an active-material based actuator 18 is caused to selectively move the pins 34 between the raised and lowered conditions, as previously described.

In operation, it is appreciated that a signal source 76 (e.g., power supply) is communicatively coupled to the element 20, and operable to generate a suitable activation signal to activate the element 20 (FIG. 2). For example, where a Joule heating signal is to be applied in an automotive setting, the source 76 may consist of the charging system of a vehicle, including the battery, and the element 20 may be interconnected thereto, through leads 78 (FIG. 2), or suitable short-range wireless communication (e.g., RF, etc.). Alternatively, the source 76 may include a capacitor fed by a low current supply, e.g., a plurality of piezoelectric elements operatively positioned relative to the seat 12, so as to be self-contained. Though fed over an extended period, the capacitor is operable to rapidly release sufficient current for actuation.

A switch (e.g., push button) or otherwise input receiving device 80 communicatively coupled to the element 20 and source 76 (FIG. 2) may be used by a user to close the circuit, resulting in the activation of the associated element 20; or, in the alternative, the adjuster 10 may be autonomously actuated. For example, where composing a power adjustment system, the element 20 may be exposed to the signal over a selected one of a plurality of durations that correspond to a demand to autonomously adjust the position of the seat 12 to a specific location. The duration of exposure is configured to enable the seat 12 to be adjusted to the corresponding location and be re-locked without undue delay. Moreover, the actuator 18 may be configured to receive sensory input and expose the element 20 to the activation signal based upon the input. It is appreciated that suitable algorithms, processing capability, and sensor selection/inputs are well within the skill of those in the art in view of this disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A fore-aft position adjuster adapted for use with a seat, said adjuster comprising:
    a locking member securely connected to the seat, so as to be translatable therewith;
    a fixed structure connected to a base,
        wherein the member and structure are cooperatively configured so as to be caused to achieve one of disengaged and engaged conditions,
        wherein the member and seat are free to translate in the disengaged condition, and fixed in the engaged condition, relative to the base; and
    an actuator drivenly coupled to the structure or member, including an active material element operable to undergo a reversible change when exposed to or occluded from an activation signal, wherein the element defines a bowstring configuration of predetermined trigonometry, and produces an actuation force that acts upon the member or structure,
    said actuator being configured to selectively cause the member and structure to achieve the other of said conditions, as a result of the change, and amplify the force so as to provide mechanical advantage.

2. The adjuster as claimed in claim 1, wherein the member defines a first plurality of teeth, the structure is moveably connected to the base and defines a second plurality of teeth, the first and second pluralities of teeth are cooperatively configured to be selectively inter-meshed in the engaged condition, and the element is drivenly coupled to the structure so as to cause the structure to move to the disengaged condition.

3. The adjuster as claimed in claim 1, further comprising a return mechanism drivenly coupled to the structure or member, configured to act antagonistically to the actuator, and producing a biasing force less than the actuation force, such that the mechanism causes the structure and member to achieve the engaged condition when the element is deactivated and allows the actuator to cause the structure and member to achieve the disengaged condition when the element is activated.

4. The adjuster as claimed in claim 3, wherein the return mechanism is selected from the group consisting essentially of compression, extension, leaf, torsion, hydraulic/pneumatic springs, elastomeric components, counterweights, and a second active material element.

5. The adjuster as claimed in claim 1, wherein the element is formed of an active material selected from the group consisting essentially of shape memory polymers, electroactive polymers, piezoelectric composites, magneto-restrictives, and electro-restrictives.

6. The adjuster as claimed in claim 5, wherein the structure and member presenting first and second longitudinal channels, wherein the channels are configured to enable only fore-aft motion between the structure and member, the first channel defines a plurality of holes, the second channel includes at least one translatable pin, and each pin is concentrically alignable with a selected one of the holes and selectively caused to achieve a raised condition, wherein the pins protrude through said selected one of the holes.

7. The adjuster as claimed in claim 6, wherein the actuator includes a translatable bar configured to selectively engage said at least one pin when in the raised condition, so as to concurrently drive each pin towards a lowered condition wherein the member and structure are disengaged.

8. The adjuster as claimed in claim 6, wherein said at least one pin is biased towards the raised condition.

9. A fore-aft position adjuster adapted for use with a seat, said adjuster comprising:
    a locking member securely connected to the seat, so as to be translatable therewith;
    a fixed structure connected to a base,
        wherein the member and structure are cooperatively configured so as to be caused to achieve one of disengaged and engaged conditions, wherein the member and seat are free to translate in the disengaged condition, and fixed in the engaged condition, relative to the base;

an actuator drivenly coupled to the structure or member, including a shape memory wire operable to undergo a reversible change in length when exposed to or occluded from an activation signal, operable to selectively cause the member and structure to disengage as a result of the change, and defining a bowstring configuration of predetermined trigonometry, so as to provide mechanical advantage; and a return mechanism drivenly coupled to the structure or member, configured to act antagonistically to the actuator, and producing a biasing force less than the actuation force, such that the mechanism causes the structure and member to achieve the engaged condition when the element is deactivated and allows the actuator to cause the structure and member to achieve the disengaged condition when the element is activated, said structure and member presenting first and second longitudinal channels, wherein the channels are configured to enable only fore-aft motion between the structure and member.

10. A method of adjusting the fore-aft position of an object, comprising:
 a. securing the object to a base utilizing a locking mechanism;
 b. exposing an active material element defining a bowstring configuration to an activation signal, so as to activate the element and produce an actuation force, amplifying the force, applying the amplified force to the mechanism;
 c. causing the mechanism to disengage, as a result of applying the amplified force, so that the object is able to translate relative to the base;
 d. adjusting the fore-aft position of the object;
 e. occluding the element from the activation signal, so as to deactivate the element; and
 f. causing or allowing the mechanism to re-lock as a result of deactivating the element.

11. The method as claimed in claim 10, wherein step b) further includes the steps of receiving an input, and selectively delivering an electric current to a shape memory alloy element so as to Joule heat the element only when the input is received.

12. The method as claimed in claim 10, wherein steps b) and d) further include the steps of exposing the element to the signal over a selected one of a plurality of durations, wherein the durations enable the object to be adjusted to a corresponding plurality of locations.

13. The method as claimed in claim 10, wherein steps b) and d) further include the steps of detecting a condition, receiving sensory input, and exposing the element to the signal in response to the input.

\* \* \* \* \*